(12) United States Patent
Kurihara et al.

(10) Patent No.: US 8,697,263 B2
(45) Date of Patent: Apr. 15, 2014

(54) SHEET WITH PULP FIBER TANGLED AROUND A MAGNETIC MATERIAL WITH SPACED COATINGS

(75) Inventors: Eizo Kurihara, Kanagawa (JP); Katsumi Sakamaki, Kanagawa (JP); Mario Fuse, Kanagawa (JP); Shoji Yamaguchi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/296,622

(22) Filed: Nov. 15, 2011

(65) Prior Publication Data

US 2012/0276363 A1 Nov. 1, 2012

(30) Foreign Application Priority Data

Apr. 26, 2011 (JP) ................. 2011-098293

(51) Int. Cl.
  *B41M 5/00* (2006.01)
  *D21F 1/00* (2006.01)

(52) U.S. Cl.
  USPC ........ 428/846; 428/164; 428/692.1; 428/800; 442/330; 442/352; 442/353; 442/414; 442/415; 235/493

(58) Field of Classification Search
  None
  See application file for complete search history.

(56) References Cited

U.S. PATENT DOCUMENTS

| 3,256,584 | A | 6/1966 | Parkhachev |
| 7,233,249 | B2 * | 6/2007 | Liebermann et al. ...... 340/572.6 |
| 7,638,209 | B2 * | 12/2009 | Koda et al. ............. 428/800 |
| 2003/0207144 | A1 | 11/2003 | Sawa et al. |
| 2007/0014973 | A1 | 1/2007 | Koda et al. |
| 2008/0013212 | A1 * | 1/2008 | Fuse et al. ............. 360/131 |

FOREIGN PATENT DOCUMENTS

| EP | 1 662 443 A2 | 5/2006 |
| JP | A-7-243190 | 9/1995 |
| JP | A-2001-55691 | 2/2001 |
| JP | 2005146477 A * | 6/2005 |
| JP | A-2007-21884 | 2/2007 |
| JP | A-2007-169837 | 7/2007 |
| JP | A-2007-177332 | 7/2007 |
| JP | A-2007-177361 | 7/2007 |
| JP | A-2007-284809 | 11/2007 |
| JP | A-2008-111207 | 5/2008 |
| WO | WO 97/24734 A1 | 7/1997 |

OTHER PUBLICATIONS

Larin, V S Torcunov, A.V., Zhukov, A., Gonzalez, J., Vazquez, M. and Panina, L., Preparation and Properties of Glass-Coated Microwires, 2002, Journal of Magnetism and Magnetic Materials, vol. 249, pp. 39-45.*

Apr. 18, 2012 Search Report issued in Extended European Patent Application No. 11190270.6.

* cited by examiner

*Primary Examiner* — Michael H Wilson
*Assistant Examiner* — Christine Rea
(74) *Attorney, Agent, or Firm* — Oliff PLC

(57) ABSTRACT

A sheet includes a pulp fiber and a linear magnetic material. The linear magnetic material has a substantially large Barkhausen effect. The linear magnetic material also has irregularities at an outer periphery of the linear magnetic material. The sheet in which the magnetic material is inhibited from being exposed at both surfaces of the sheet can be provided.

14 Claims, 6 Drawing Sheets

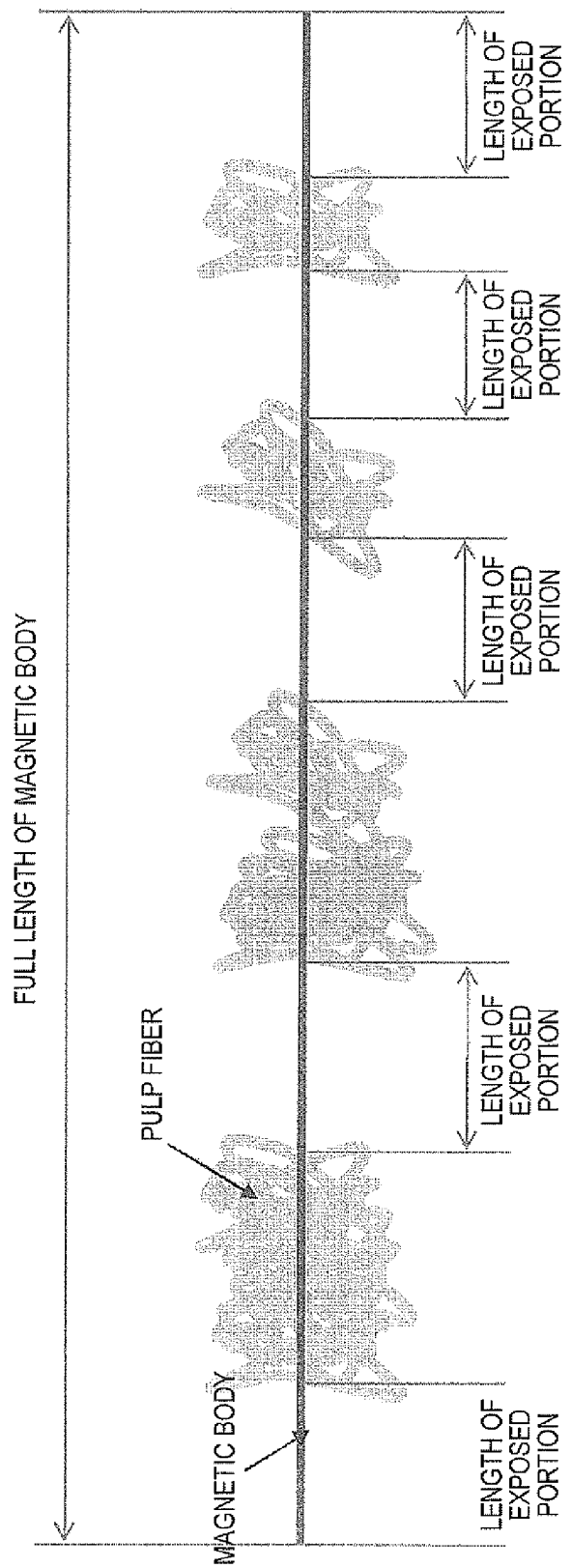

SHEET WITH PULP FIBER TANGLED AROUND A MAGNETIC MATERIAL WITH SPACED COATINGS

CROSS-REFERENCE TO RELATED APPLICATION

This application is based on and claims priority under 35 USC 119 from Japanese Patent Application No. 2011-098293 filed Apr. 26, 2011.

BACKGROUND

Technical Field

The present invention relates to a sheet.

SUMMARY (1) According to an aspect of the invention, a sheet includes a pulp fiber and a linear magnetic material. The linear magnetic material has a substantially large Barkhausen effect and has irregularities at an outer periphery of the linear magnetic material.

BRIEF DESCRIPTION OF THE DRAWINGS

Exemplary embodiments of the invention will be described in detail based on the following figures, wherein:

FIG. 6 is a schematic view to describe a method for calculating a pulp fiber coverage in the Example.

DETAILED DESCRIPTION

Figure 1:
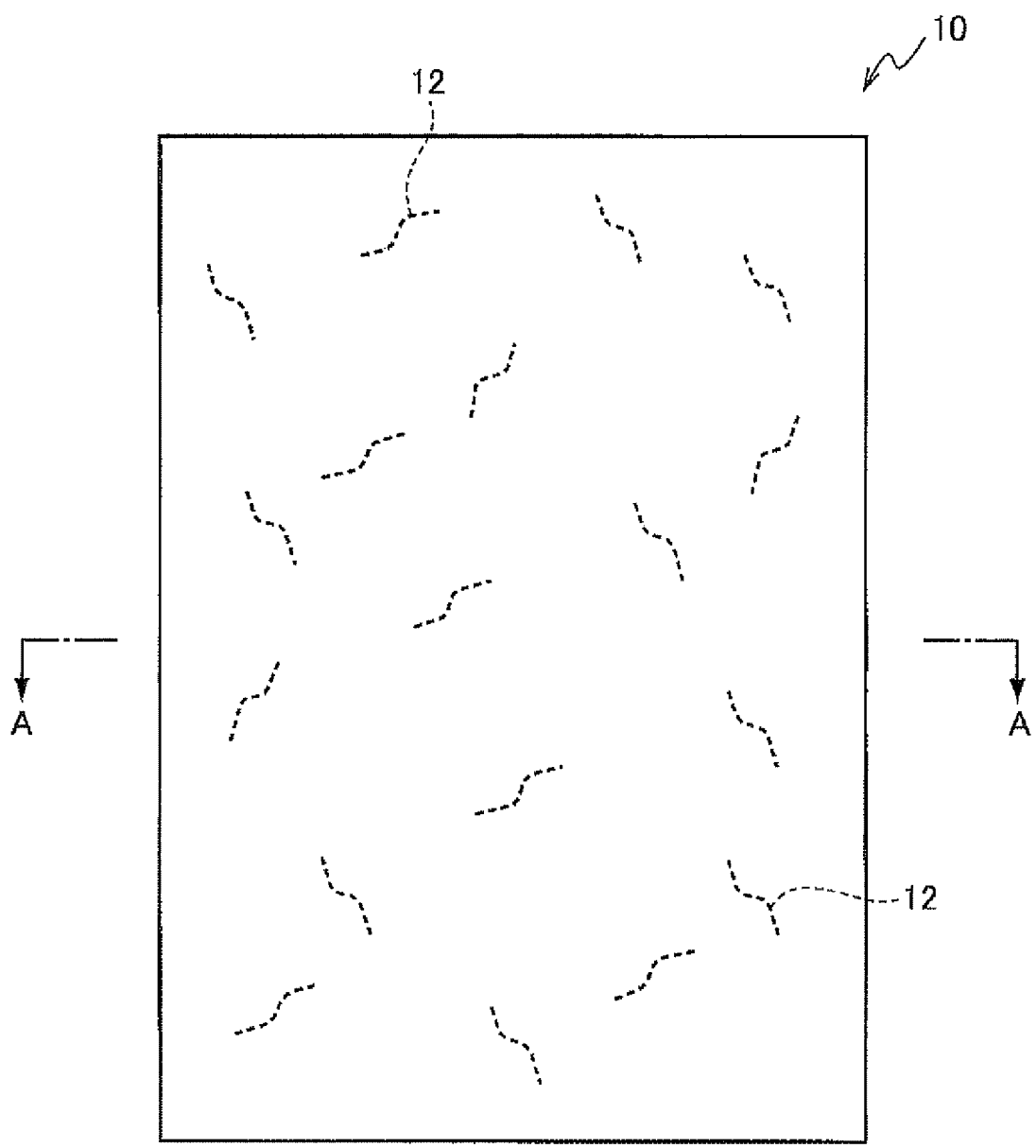
FIG. 1 is a plan view illustrating paper according to an embodiment of the present invention.

Hereinafter, embodiments of the present invention will be described with reference to the accompanying drawings. It is noted that members having substantially the same function are denoted by the same reference numerals throughout the drawings and an overlapped explanation thereof may be omitted.

Figure 2:
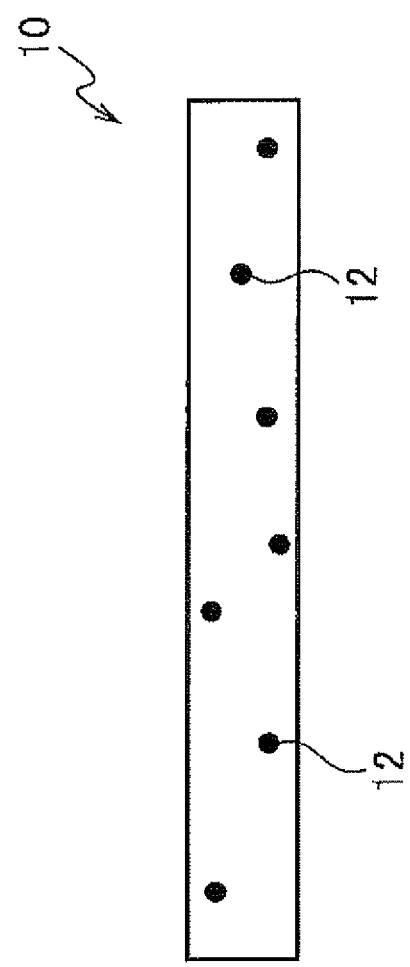
FIG. 2 is a cross-sectional view illustrating the paper according to the embodiment of the present invention.

FIG. 1 is a view illustrating the paper according to an embodiment of the present invention. FIG. 2 is a cross-sectional view illustrating the paper according to the embodiment of the present invention. FIGS. 3A to 3E are schematic configuration diagrams illustrating a linear magnetic material (a magnetic body) according to the embodiment of the present invention.

FIG. 2 corresponds to the A-A cross-sectional view in FIG. 1.

Sheet 10 according to the embodiment of the present invention, as shown in FIGS. 1 and 2, is configured to include for example, pulp fibers (not shown), a linear magnetic material 12 (hereinafter, referred to as a magnetic body 12), and other additives such as a filler, if necessary.

Specifically, the sheet 10 according to the embodiment of the present invention is made, for example, by mixing the magnetic body 12 with the sheet 10 which is composed of pulp fibers. That is, the sheet 10 according to the embodiment of the present invention is obtained by mixing and dispersing pulp fibers and the magnetic body 12 and then paper-making with the mixture.

The magnetic body is a magnetic body 12 which has a large Barkhausen effect and irregularities consisting of convexes 12A and concaves 12B on the outer periphery of the magnetic body (See FIGS. 3A to 3E and 4A to 4B).

A magnetic material is inhibited from being exposed at both surfaces of the sheet 10 according to the embodiment of the present invention by including the magnetic body 12 which has irregularities on the outer periphery.

This is due to the fact that because the magnetic body 12 has irregularities on the outer periphery and pulp fibers are easily entangled by the irregularities, pulp fibers are presently entangled on the outer periphery even though the magnetic body 12 is present adjacent to both surfaces of the sheet 10. And as a result, the magnetic body 12 is considered to be inhibited from being exposed at both surfaces of the sheet 10. Sheet includes a paper that is used for inkjet printing, xerography printing and other printings.

Hereinafter, each configuration of the sheet 10 according to the embodiment of the present invention will be described in detail.

First, the magnetic body 12 will be described.

The magnetic body 12, as shown in FIGS. 3A to 3E, has, for example, irregularities (consisting of a convex portion 12A and a concave portion 12B) on the outer periphery.

Specifically, the magnetic body 12 consists of, for example, a magnetic main body 14 whose diameter is constant in the longitudinal direction (strictly speaking, it is not constant) and a coated layer 16 partially formed on the outer periphery of the magnetic main body 14.

In the magnetic body 12, the coated layer 16, for example, is cylindrically formed in the circumferential direction on the outer periphery of the magnetic main body 14, and a plurality of the layers are formed spaced apart from each other in the longer longitudinal direction of the magnetic main body 14.

In the magnetic body 12, steps are formed by the partially formed coated layers 16 and the magnetic main body 14, providing irregularities (consisting of a convex portion 12A and a concave portion 12B). That is, in the magnetic body 12, for example, the convex portion 12A is configured by the partially formed coated layers 16 and the concave portion 12B is configured by a gap between the adjacent coated layers 16 spaced apart from each other.

In the magnetic body 12, the height of the convex portion 12A (the thickness of the coated layer 16 in the present embodiment) may be, for example, 1 μm or more (preferably 5 to 100 μm).

The width of the concave portion 12B (the gap between the adjacent coated layers 16 spaced apart from each other in the embodiment: the length in the longitudinal direction of the magnetic main body 14) may be, for example, 30 μm or more (preferably 50 to 1000 μm).

If the height of the convex portion 12A and the width of the concave portion 12B are satisfied, the magnetic body 12 is easily entangled with pulp fibers, such that the magnetic material is easily inhibited from being exposed at both surfaces of the paper.

In the magnetic body 12, a boundary portion between the convex portion 12A and the concave portion 12B (that is, the end face of the coated layer 16 in the embodiment) may be perpendicular (see FIGS. 3A and 313) and slanted (see FIGS. 3C and 3D), to the longitudinal direction of the magnetic main body 14.

Figure 3A:
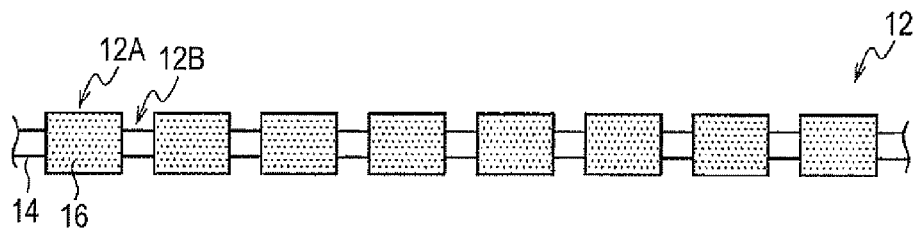
FIGS. 3A to 3E are schematic configuration diagrams illustrating a linear magnetic material (a magnetic body) according to an embodiment of the present invention.
Figure 3B:
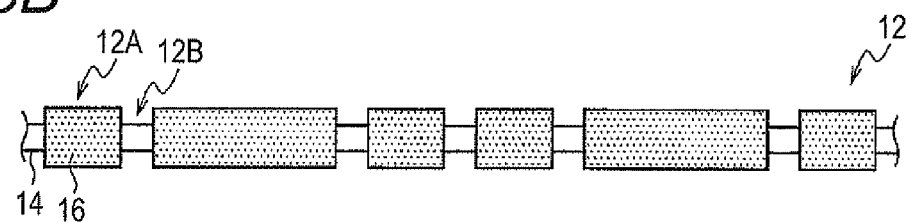

The width of a plural coated layers 16 partially formed (the width of the convex portion 12A: the length in the longitudinal direction of the magnetic main body 14) may be constant (see FIGS. 3A, 3C and 3D) or may be different (see FIG. 3B).

Figure 3C:
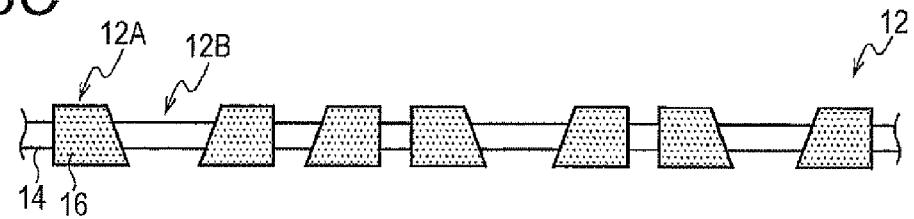
Figure 3D:
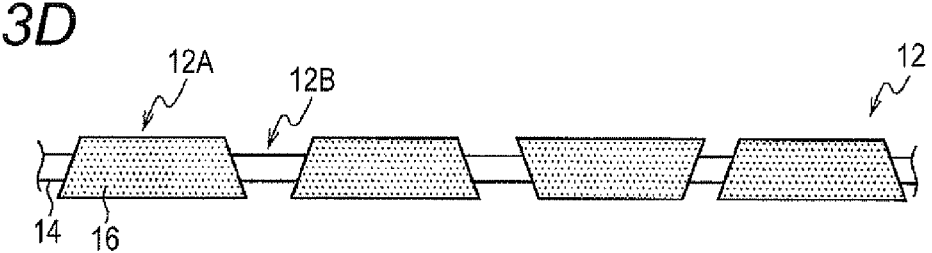
Figure 3E:
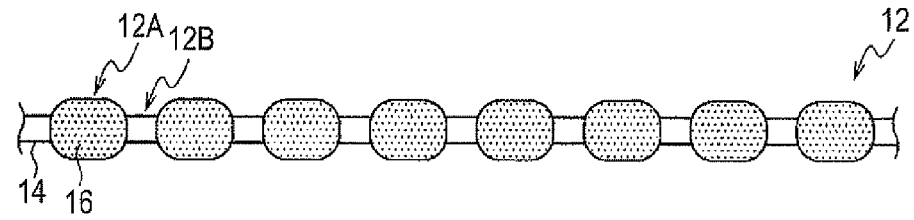

The gap of the adjacent coated layers 16 spaced apart from each other (the width of the concave portion 12B: the length in the longitudinal direction of the magnetic main body 14) may be constant (see FIGS. 3A and 3B) or may be different (see FIGS. 3C and 3D).

The convex portion 12A and the concave portion 12B may be configured to be bent (see FIGS. 3A, 3B, 3C and 3D) or to be inflected (see FIG. 3E) with respect to a cross-sectional shape of the magnetic body 12 (a shape cut along the longitudinal direction of the magnetic body 12).

In FIGS. 3A to 3E, the boundary portion (that is, the end face of the coated layer 16) is even, but is not limited thereto and may be uneven (for example, when irregularities are formed by destructing the coated layer 16 of glass, which will be described below, an uneven surface with a plurality of protrusions is produced).

The magnetic main body 14 will be described.

Magnetic properties, composition, shape, etc. of the magnetic main body 14 are not particularly limited as long as the magnetic main body 14 is made of a magnetic material having characteristics that cause a large Barkhausen effect.

However, magnetic properties of the magnetic main body 14 may be excellent when a hysteresis loop thereof is almost rectangular and the retention (Hc) is relatively small.

The composition of the magnetic main body 14 may include alloys (e.g., Co-based, Fe-based, Ni-based, a mixed system thereof, etc., and specifically, Co—B—Si, Co—Fe—B—Si, etc.) including magnetic elements (e.g., Co, Fe, and Ni), transition metals, and glass-forming elements (e.g., Si, B, C, and P). And, those magnetic main bodies having various magnetic characteristics obtained by selecting the composition ratios or preparation methods of its constituent elements are utilized. The color of an amorphous alloy consisting of the elements is minimally affected by the ratio of its elements.

The shape of the magnetic main body 14 is not particularly limited as long as it is appropriate for causing a large Barkhausen effect, but the shape needs to be linear (wire type) because a certain length is required with respect to the cross-sectional area to cause a Barkhausen effect.

The word "linear (wire type)" refers to a concept to include circular, rectangular, or other shapes such as a shape extending as a line shape or a curved shape, as a cross-sectional shape (a shape cut along the cross-sectional direction with respect to the longitudinal direction of the magnetic main body 14).

The magnetic main body 14 may be 10 µm or more in the outer diameter, such that the magnetic body may cause a large Barkhausen effect.

As a result, when the magnetic main body 14 is included in the paper which has a thickness of, for example, 80 to 120 µm inclusive, the magnetic main body 14 may have a circular cross-sectional shape and the outer diameter thereof may be in the range of 10 to 60 µm inclusive (preferably 15 to 55 µm inclusive, and more preferably 15 to 35 µm inclusive). The length of the magnetic main body 14 depends on the outer diameter thereof, and may be in the range of 10 to 40 mm inclusive (preferably 10 to 30 mm inclusive, and more preferably 15 to 25 mm inclusive) when the outer diameter is in the range of, for example, 10 to 60 µm inclusive.

The magnetic body is obtained for example by melting a magnetic material, passing the melted magnetic material through a discharge port with a shape corresponding to a desired cross-sectional shape, and cooling the material. Specifically, a preparation method (Taylor-Ulitovsky method), so-called a single roll method which includes providing a molten alloy to a cooling roll which is rotating at a high speed to obtain a thin strip, or a twin roll method which includes providing a molten metal between a pair of cooling rolls which are rotating at a high speed to obtain a thin strip, etc., may be used.

Subsequently, a coated layer 16 will be described.

Materials for the coated layer 16 are not particularly limited as long as they are known insulating materials, and may include, for example, resin materials (e.g., polyester resin), inorganic materials (e.g., silicon oxide, etc.), glass, etc.

Methods for forming the coated layer 16 are not particularly limited and include known thin film formation methods, such as a vapor phase film formation methods including, for example, a sputtering, a Chemical Vapor Deposition (CVD), a vacuum deposition, etc., or liquid phase film formation methods including, for example, a dipping coating, a roller coating, a spray coating, a coating using a sol-gel method, etc., according to materials constituting the coated layer 16. Among them, vapor phase film formation methods are preferred for forming a uniform and thinner coated layer 16.

When a coated layer 16 of glass is formed, a preparation method (Taylor-Ulitovsky method) may be used. Specifically, a metal alloy is charged in a glass tube and the front edge of the glass tube is overheated and melted with an induction coil to cover the periphery of the metal molten material (periphery of the magnetic main body 14) with melted glass and it is rapidly cooled with a cooling medium to form a coated layer 16 of glass on the outer periphery of the magnetic main body 14.

The formation of the coated layer 16 may be performed simultaneously with the magnetic main body 14 (that is, the wire making). For example, a molten magnetic material may be processed into a wire type, and immediately after a magnetic main body 14 is obtained, the magnetic main body 14 may be simultaneously cooled to form an insulating layer by a vapor phase film formation method such as CVD, etc.

For example, methods for forming a coated layer 16 partially on the outer periphery of a magnetic main body 14 may include the following methods.

1) A method for forming a coated layer 16 partially on the outer periphery of the magnetic main body 14 by forming the coated layer 16 throughout the outer periphery of the magnetic main body 14 in accordance with the above-mentioned method and then partially providing mechanical load (e.g., such as pressure, friction, shock, etc.) to the coated layer 16 to partially remove the coated layer 16, 2) a method for forming a coated layer 16 partially on the outer periphery of a magnetic main body 14 by changing a rapid cooling condition by a cooling medium or changing the preparation speed in a certain condition in the above-mentioned method, and 3) a method for forming a coated layer 16 partially on the outer periphery of a magnetic main body 14 by coating the magnetic body with, e.g., a typical thermoplastic resin instead of glass using a blade, etc., and scraping the thermoplastic resin coating layer at a predetermined interval after the coating, etc., may be used.

Subsequently, the content of a magnetic body 12 will be described.

The content of the magnetic body 12 may be, for example, 1 to 50 strands (preferably 3 to 40 strands, and more preferably 5 to 30 strands) per sheet of the sheet 10.

Figure 4A:
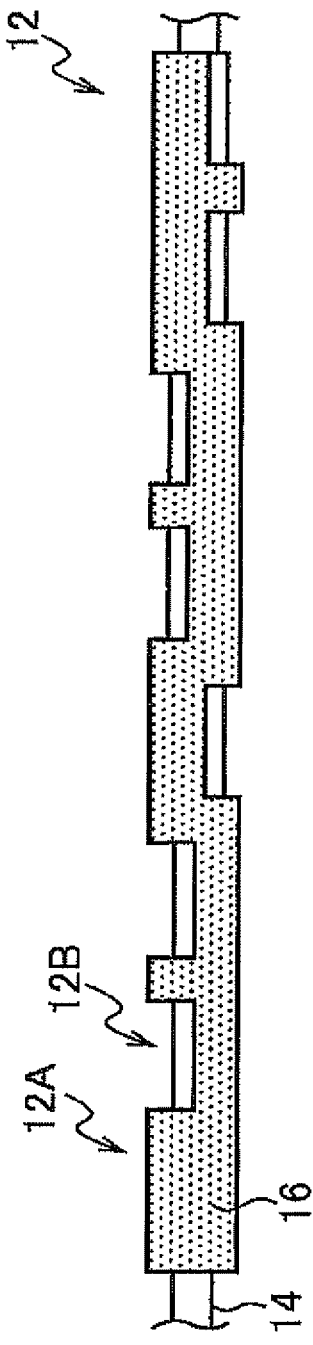
FIGS. 4A and 4B are schematic configuration diagrams illustrating a linear magnetic material (a magnetic body) according to another embodiment of the present invention.
Figure 4B:
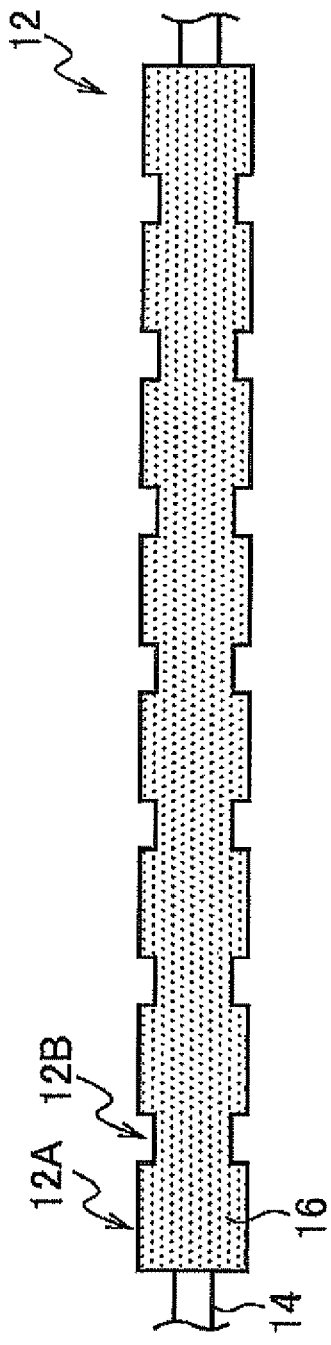

The magnetic body 12 is not limited to the above-mentioned configuration, and may be, for example:

1) a form in which a plural notches are formed at the predetermined intervals on a coated layer 16 continuously formed on the outer periphery of a magnetic main body 14 and irregularities are provided by the notches, as shown in FIG. 4A, and 2) a form in which a coated layer 16 having a region in which partially different thicknesses are present is formed on the outer periphery of a magnetic main body 14 to provide irregularities between the region having different thicknesses, as shown in FIG. 4B.

Among the magnetic bodies 12 described above, a magnetic body 12 constituted with a magnetic main body 14 and a coated layer 16 is preferred where the coated layer 16 including glass is partially formed on the outer periphery of a magnetic main body 14.

This is due to the fact that the coated layer 16 may be partially formed on the outer periphery of the magnetic main body 14 by temperature control during glass coating or may be easily formed on the outer periphery of the magnetic main body 14 by varying its thickness partially, and irregularities may be simply provided on the outer periphery of the magnetic body 12. It is also due to the fact that because glass is easily broken by impact and a coated layer 16 of glass is apt to be partially separated due to impact after the coated layer 16 is formed throughout the outer periphery of a magnetic main body 14, irregularities may be simply provided on the outer periphery of the magnetic body 12.

Hereinafter, pulp fibers will be described.

Known pulp fibers may be used.

Specific examples of pulp fibers may include wood pulp fiber (e.g., hardwood tree bleached Kraft pulp fiber, hardwood tree unbleached Kraft pulp fiber, softwood tree bleached Kraft pulp fiber, softwood tree unbleached Kraft pulp fiber, hardwood tree bleached sulfite pulp fiber, hardwood tree unbleached sulfite pulp fiber, softwood tree bleached sulfite pulp fiber, softwood tree unbleached sulfite pulp fiber, etc.) and non-wood pulp fiber (e.g., cotton pulp fiber, hemp pulp fiber, straw (e.g., rice straw and barley straw) pulp fiber, bamboo pulp fiber, reed pulp fiber, Kenaf pulp fiber, sugarcane pulp fiber, etc.).

Specific examples of pulp fibers may include ground wood pulp fibers prepared by mechanically pulping wood and chips, chemo-mechanical pulp fibers prepared by mechanically pulping chemical-impregnated wood and chips, thermo-mechanical pulp fibers prepared by pulping the chips slightly softened by previous steaming in a refiner, etc.

Pulp fiber may be used alone or a combination of two or more pulp fibers may be used.

Among the pulp fibers, softwood tree pulp fiber (e.g., softwood tree bleached Kraft pulp fiber, softwood tree unbleached Kraft pulp fiber, softwood tree bleached sulfite pulp fiber, softwood tree unbleached sulfite pulp fiber, etc.) and non-wood pulp fiber are preferred. These softwood tree pulp fiber and non-wood pulp fiber tend to have longer fibers than other pulp fibers, and thus are easily entangled with a magnetic body 12, and particularly, a magnetic material is easily inhibited from being exposed to both surfaces of a paper.

At least one selected from the softwood tree pulp fibers and the non-wood pulp fibers may be present in an amount of 1 to 100% by mass (preferably 5 to 80% by mass) based on the total amount of the pulp fiber.

The pulp fibers may be prepared from only virgin pulp fibers or combined with waste paper pulp fibers if necessary.

In particular, the virgin pulp is preferably bleached by a method that uses only chlorine dioxide but not chlorine gas (Elementally Chlorine Free: ECF) or by a method that uses ozone/hydrogen peroxide or the like but not a chlorine compound (Total Chlorine Free: TCF).

Raw materials for the waste paper pulp fibers include unprinted waste papers of extremely high-quality, high-quality, medium-grade white, low-grade, and other white papers that are cut, damaged, and irregular in size generated in bookmakers, printshops, cutting facilities, and the like; high-quality printed waste papers such as woodfree and coated woodfree papers that are printed or copied; waste papers printed with inks such as aqueous and oil-based inks or with lead pencils; newspaper waste papers containing advertising leaflets of printed high-quality papers, high-quality coated paper, medium-grade papers, or medium-grade coated papers; and waste papers of medium-grade papers, medium-grade coated papers, pulp papers, and the like.

Preferably, waste paper pulp fibers obtained at least either by ozone or hydrogen peroxide bleaching treatment of raw materials for waste papers may be used. In order to obtain a base paper which is high in whiteness, it is preferable to make the blending ratio of the waste paper pulps obtained by the bleaching treatment in the range of 50 to 100% by weight. From the viewpoint of resource recycling, the blending ratio of the waste paper pulps is more preferably in the range of 70 to 100% by weight.

Subsequently, other additives will be described.

Examples of fillers to be added to the sheet 10 include white inorganic pigments such as heavy calcium carbonate, light calcium carbonate, chalk, kaolin, calcined clay, talc, calcium sulfate, barium sulfate, titanium dioxide, zinc oxide, zinc sulfide, zinc carbonate, aluminum silicate, calcium silicate, magnesium silicate, synthetic silica, aluminum hydroxide, alumina, sericite, white carbon, saponite, calcium monmorillonite, sodium monmorillonite, bentonite, and the like; and organic pigments such as acrylic plastic pigments, polyethylene, and urea resins. If waste paper pulps are blended to the base paper, the blending amount of the filler should be adjusted by previously estimating the ashes contained in the raw waste-paper materials.

An internal sizing agent is preferably added to the sheet 10. Examples of the internal sizing agents include those used in neutral sheeting processes such as neutral rosin-based sizing agents, alkenyl succinic anhydrides (ASA), alkylketene dimers (AKD), and petroleum resin-based sizing agents.

When the surface of the sheet 10 is desirably modified to be cationic, the surface may be treated by a hydrophilic cation resin or the like.

In order to suppress penetration of the cationic resin into the sheet 10, the sizing degree of the paper before application of the cationic resin is preferably 10 seconds or more and less than 60 seconds.

A paper-strength improver may be added internally or externally to the sheet 10, if necessary.

Examples of the paper-strength improvers include starch, modified starches, vegetable gums, carboxymethylcellulose, polyvinylalcohol, polyacrylamide, urea-formaldehyde resins, melamine-formaldehyde resins, dialdehyde starch, polyethyleneimine, epoxidized polyamides, polyamide-epichlorohydrin resins, methylol-modified polyamides, chitosan derivatives, etc.

Various agents mixed with typically used paper media, such as dye and pH adjuster, etc., may be added to the sheet 10.

The sheet 10 may be treated with a surface-sizing solution if necessary, or a surface treatment to form a coat layer may be performed. The surface treatment may be carried out by applying a surface sizing solution or a coating solution for forming a coating layer to a base paper by using an application module typically used in the art, such as size press, shim size, gate roll, roll coater, bar coater, air knife coater, rod blade coater, blade coater, etc.

The thickness of the paper may be, for example, 80 to 120 µm.

Hereinafter, the present invention will be described in more detail with reference to Examples. However, each of these Examples is not intended to limit the present invention.

EXAMPLE 1

(Preparation of Magnetic Body A)

Magnetic body in which irregularities are formed by partially forming a glass-coated layer (FIGS. 3A to 3E, etc.)

A glass-coated magnetic body is prepared by the Taylor Ulitovsky method (main ingredient: Co and Ni, outer diameter: 50 µm, and inner diameter: 30 µm), 1 g of a magnetic wire cut into pieces of 40 mm in length is put into a 500 ml beaker (water: 400 ml), and the resulting mixture is stirred with a stirrer (Labo-Stirrer Model LR-51A, manufactured by Yamato Scientific Co., Ltd.) for 30 min. The fin used for stirring is 30 mm in length from the center and 12 mm in width, and stirrer has 4 fins (rectangular). The stirring speed is 10 (maximum) of the memory (10 steps) of the stirrer. After the stirring is completed, a magnetic body is dried.

The magnetic body A is prepared in this manner.

(Control of Pulp Slurry)

Pulp slurry using softwood tree pulps

To a pulp slurry including 90 parts by mass of a pulp slurry of hardwood tree bleached Kraft pulp (LBKP) and 10 parts by mass of a pulp slurry of softwood tree bleached Kraft pulp (NBKP), 0.15 part by mass of a cationized starch (trade name: MS4600 manufactured by Nihon Shokuhin Kako Co., Ltd.) and 0.1 part by mass of an alkenyl succinic anhydride (Fiblan 81, manufactured by National Starch & Chemical Japan Co., Ltd.) respectively based on 100 parts by mass of the solid pulp fiber are added.

(Making of Paper)

10 strands of the magnetic body A are mixed with a pulp slurry obtained (solid concentration 1.0% by mass) and a hand sheet is manufactured by a round sheet machine (manufactured by Kumagai Riki Kogyo Co., Ltd.)

The manufactured hand sheet is pressed at a pressure of 10 kgf/cm$^2$c for 1 min with a square sheet machine press (manufactured by Kumagai Riki Kogyo Co., Ltd.), and dries with a KRK rotary drier (manufactured by Kumagai Riki Kogyo Co., Ltd.) at a heating temperature of 100° C. and a rotation speed of 10 cm/min to obtain the paper having an average of 86 g/m$^2$.

EXAMPLE 2

(Preparation of Magnetic Body B)

Magnetic body in which irregularities are formed by partially forming a resin-coated layer (FIGS. 3A to 3E, etc.)

A thermoplastic polyester resin (Vylonal MD1500 manufactured by Toyobo Co., Ltd.) is applied to both surfaces of a magnetic ribbon (main ingredients: Co and Ni, width: 80 mm, length: 200 mm, and thickness: 40 µm) manufactured by a single roll method such that the applied thickness of the one surface is in the range of 25 to 30 µm, and then dries. After drying, the applied surface is cut at an interval of 1 mm to make a groove having a width of 400 to 600 µm and a depth of 15 to 20 µm in the transverse direction. Next, a segment having a width of 100 µm and a length of 200 mm is prepared and cut into a length of 25 mm.

The magnetic body B is prepared in this manner.

(Making of Paper)

A pulp slurry is controlled and the paper is made in the same manner as in Example 1, except that the magnetic body B is used instead of the magnetic body A.

EXAMPLE 3

(Control of Pulp Slurry)

A pulp slurry using non-wood pulp

To a pulp slurry including 90 parts by mass of a pulp slurry of hardwood tree bleached Kraft pulp (LBKP) and 10 parts by mass of a pulp slurry of Kenaf (non-wood pulp), 0.15 part by mass of a cationized starch (trade name: MS4600 manufactured by Nihon Shokuhin Kako Co., Ltd.) and 0.1 part by mass of an alkenyl succinic anhydride (Fiblan 81, manufactured by National Starch & Chemical Japan Co., Ltd.), respectively, based on 100 parts by mass of the solid pulp fiber are added The pulp slurry is controlled in this manner.

(Making of Paper)

The paper is made in the same manner as in Example 1, except that the obtained pulp slurry is used.

EXAMPLE 4

(Control of Pulp Slurry)

Pulp slurry using pulps other than softwood tree pulps and non-wood pulps

To a pulp slurry including 100 parts by mass of a pulp slurry of hardwood tree bleached Kraft pulp (LBKP), 0.15 part by mass of a cationized starch (trade name: MS4600 manufactured by Nihon Shokuhin Kako Co., Ltd.) and 0.1 part by mass of an alkenyl succinic anhydride (Fiblan 81, manufactured by National Starch & Chemical Japan Co., Ltd.), respectively, based on 100 parts by mass of the solid pulp fiber are added.

The pulp slurry is controlled in this manner.

(Making of Paper)

The paper is made in the same manner as in Example 1, except that the obtained pulp slurry is used.

Comparative Example 1

(Preparation of Comparative Magnetic Body)

Magnetic body without irregularities

A glass-coated magnetic body wire (main ingredients: Co and Ni, outer diameter: 50 µm, and inner diameter: 30 µm) is prepared by the Taylor-Ulitovsky method and cut into pieces of 40 mm in length.

A comparative magnetic body is prepared in this manner.

(Making of Paper)

A pulp slurry is controlled and the paper is made in the same manner as in Example 1, except that the comparative magnetic body is used instead of the magnetic body A.

[Evaluation]

An evaluation is performed on the paper obtained by varying the degree of exposure of the magnetic body to both surfaces of the paper as follows.

Figure 5:
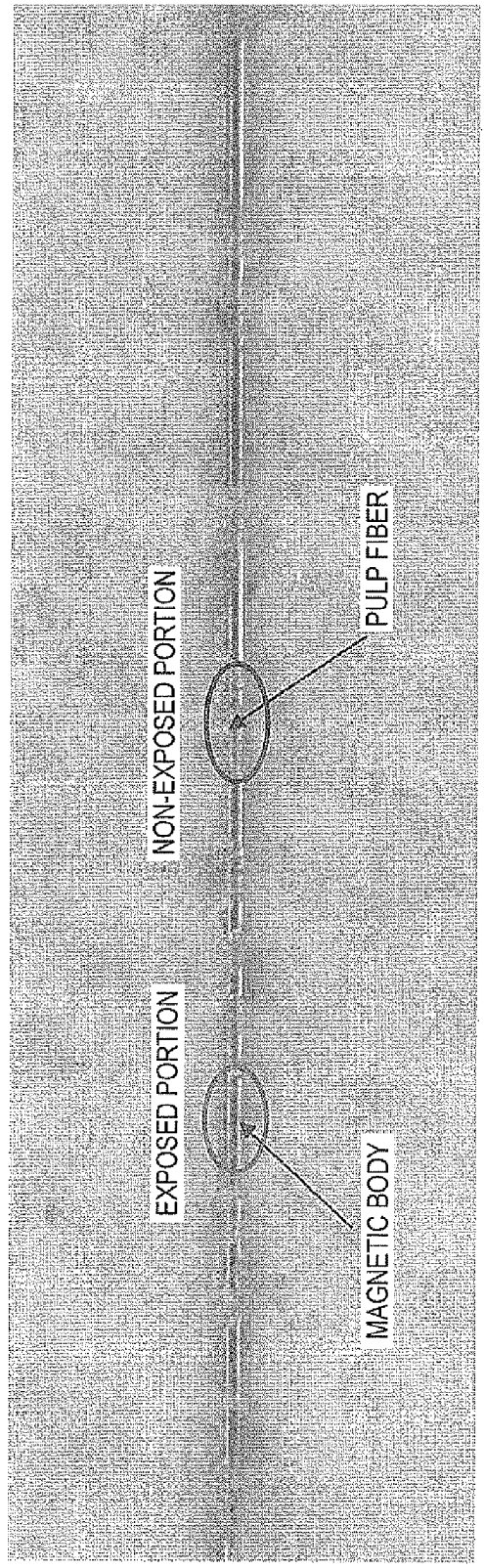
FIG. 5 is a photo illustrating the surface of the paper made in the Example, taken by a microscope, showing a linear magnetic material having a magnetic body core and coated layers spaced apart from each other by non-coated portions where pulp fiber is tangled around the non-coated portions.

A mixed portion of the magnetic body of the paper obtained is photographed at 150× magnification by using a microscope (VH-8000 manufactured by Keyence Corporation) (See FIG. 5). The magnification is 150-fold or more. The mixed portion of the magnetic body is photographed on both surfaces of the paper obtained to evaluate both of the surfaces. From a photographed image, pulp fiber coated portions and non-coated portions are visually confirmed to measure the length (length in the longitudinal direction of the magnetic body) of a non-coated portion from the central portion of the magnetic body (see FIG. 6). The following formula is applied to the result to calculate a pulp fiber coverage.

Pulp fiber coverage(%)=[(full length of a magnetic body−sum of lengths of exposed portions)/full length of a magnetic body]×100

The evaluation standard is as follows.

A: 80% or more of pulp fiber coverage of a magnetic body with an average of 10 strands B: 60% or more and less than 80% of pulp fiber coverage of a magnetic body with an average of 10 strands C: 40% or more and less than 60% of pulp fiber coverage of a magnetic body with an average of 10 strands D: 25% or more and less than 40% of pulp fiber coverage of a magnetic body with an average of 10 strands E: less than 25% of pulp fiber coverage of a magnetic body with an average of 10 strands

TABLE 1

|  | Degree of exposure of both surface of a magnetic body paper |
|---|---|
| Example 1 | A |
| Example 2 | B |
| Example 3 | A |
| Example 4 | C |
| Comparative Example 1 | E |

It is determined from the result that the exposure of a magnetic body at both surfaces of the paper is inhibited in the Example, compared to Comparative Example.

In particular, it is determined that the exposure of a magnetic body at both surfaces of the paper is inhibited in Examples 1 to 3, in which softwood tree pulps and non-wood pulps are used, compared to Example 4 in which softwood tree pulps and non-wood pulps are not used.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A sheet comprising:
a pulp fiber; and
a linear magnetic material that has a substantially large Barkhausen effect and that has irregularities at an outer periphery of the linear magnetic material, wherein:
the linear magnetic material has (i) a magnetic body core and (ii) a plurality of coated layers being cylindrically formed in a circumferential direction on an outer periphery of the magnetic body core so that the plurality of coated layers are spaced apart from each other by a plurality of non-coated portions in a longitudinal direction of the magnetic body core.

2. The sheet according to claim 1, wherein the pulp fiber is at least one selected from the group consisting of softwood tree pulp fibers and non-wood pulp fibers.

3. The sheet according to claim 1, wherein each coated layer has a thickness of 1 to 100 µm inclusive.

4. The sheet according to claim 1, wherein each coated layer has a thickness of 5 to 100 µm inclusive.

5. The sheet according to claim 1, wherein each non-coated portion between coated layers forms a gap in a range of 30 µm to 1000 µm inclusive.

6. The sheet according to claim 1, wherein each non-coated portion between coated layers forms a gap in a range of 50 µm to 1000 µm inclusive.

7. The sheet according to claim 1, wherein the sheet includes 1 to 50 strands of the magnetic material inclusive.

8. The sheet according to claim 1, wherein the sheet includes 3 to 40 strands of the magnetic material inclusive.

9. The sheet according to claim 1, wherein the sheet includes 5 to 30 strands of the magnetic material inclusive.

10. The sheet according to claim 1, wherein the pulp fiber is a softwood tree pulp fiber or a non-wood pulp fiber.

11. The sheet according to claim 1, wherein the pulp fiber is a virgin pulp fiber.

12. The sheet according to claim 1, wherein the sheet has a thickness of 80 to 120 µm inclusive.

13. The sheet according to claim 1, wherein a composition of the magnetic body core is Co—B—Si or Co—Fe—B—Si.

14. The sheet according to claim 1, wherein the pulp fiber is tangled around the plurality of non-coated portions.

* * * * *